US011287020B2

(12) United States Patent
Trézières

(10) Patent No.: US 11,287,020 B2
(45) Date of Patent: Mar. 29, 2022

(54) BALLSCREW ACTUATORS

(71) Applicant: Goodrich Actuation Systems SAS, Saint Ouen l'Aumone (FR)

(72) Inventor: Marlène Trézières, Toulouse (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 90 days.

(21) Appl. No.: 16/710,227

(22) Filed: Dec. 11, 2019

(65) Prior Publication Data
US 2020/0378484 A1 Dec. 3, 2020

(30) Foreign Application Priority Data
May 29, 2019 (EP) .................................... 19290033

(51) Int. Cl.
*F16H 3/06* (2006.01)
*F16H 27/02* (2006.01)
*F16H 29/02* (2006.01)
*F16H 29/20* (2006.01)
*F16H 25/22* (2006.01)
(Continued)

(52) U.S. Cl.
CPC ..... *F16H 25/2204* (2013.01); *F16H 57/0436* (2013.01); *F16H 57/0441* (2013.01); *F16H 57/0456* (2013.01); *F16H 57/0497* (2013.01); *F16H 2025/204* (2013.01); *F16H 2025/2062* (2013.01)

(58) Field of Classification Search
CPC ............ F16H 57/0497; F16H 25/2204; F16H 57/0436; F16H 57/0441; F16H 57/0456
See application file for complete search history.

(56) References Cited

U.S. PATENT DOCUMENTS 3,132,719 A * 5/1964 Cole ................... F16H 57/0497
184/65
3,454,136 A * 7/1969 Friedrich ............ F16H 57/0498
184/6.12
(Continued)

FOREIGN PATENT DOCUMENTS

EP 3462060 A1 4/2019
WO 2009021591 A1 2/2009
WO 2011047779 A1 4/2011

OTHER PUBLICATIONS

European Search Report for Application No. 19290033.0, dated Nov. 4, 2019, 5 pages.

*Primary Examiner* — Jake Cook
(74) *Attorney, Agent, or Firm* — Cantor Colburn LLP

(57) ABSTRACT

A ballscrew actuator comprises a ballnut having at least one first helical groove formed on a radially inner surface and defining an axis (X), a ballscrew disposed along the axis (X) within the ballnut, the ballscrew having at least one second helical groove formed on a radially outer surface and opposed to the first helical groove so as to form at least one helical raceway and a plurality of balls or rolling elements disposed in the at least one helical raceway. The ballscrew is movable relative to the ballnut between a stowed position and a deployed position. The ballscrew comprises a ballscrew bore extending axially therein. A lubrication piston is mounted for sliding movement within the ballscrew bore and divides the ballscrew bore axially into a lubricant receiving portion and a pressurising portion.

18 Claims, 5 Drawing Sheets

(51) Int. Cl.
*F16H 57/04* (2010.01)
*F16H 25/20* (2006.01)

(56) References Cited

U.S. PATENT DOCUMENTS

| | | | | |
|---|---|---|---|---|
| 5,809,838 | A | * | 9/1998 | Miyaguchi .......... F16H 25/2214 74/89.44 |
| 6,691,837 | B1 | | 2/2004 | Kapaan et al. |
| 6,711,963 | B2 | | 3/2004 | Yabe |
| 10,150,459 | B2 | * | 12/2018 | Weh ...................... B60T 13/168 |
| 2009/0308690 | A1 | * | 12/2009 | Jiang ................... F16H 57/0497 184/5 |

* cited by examiner

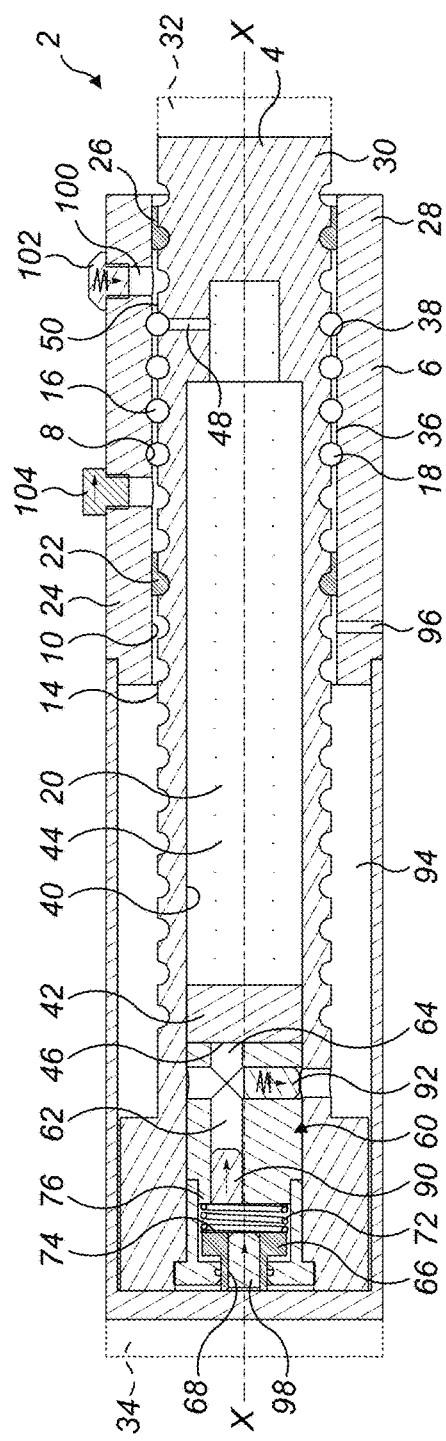

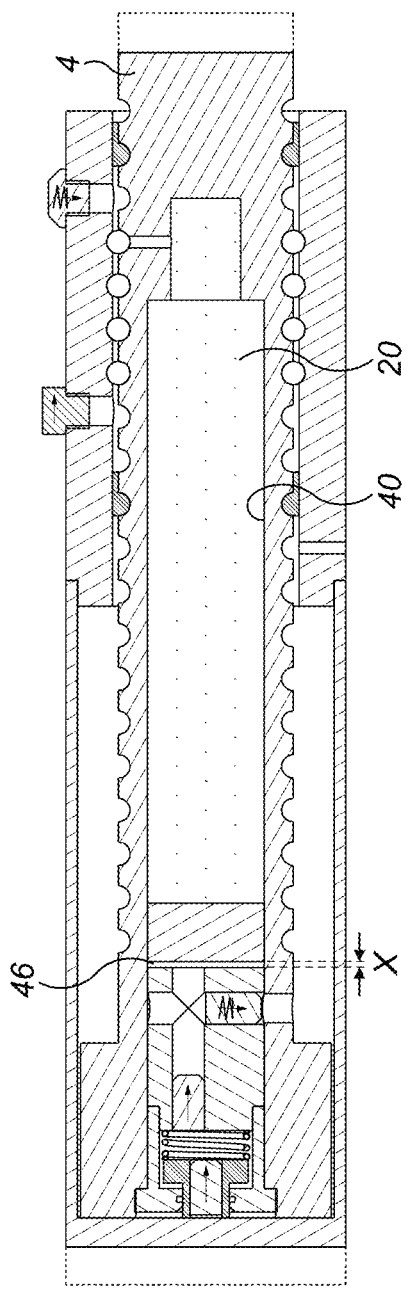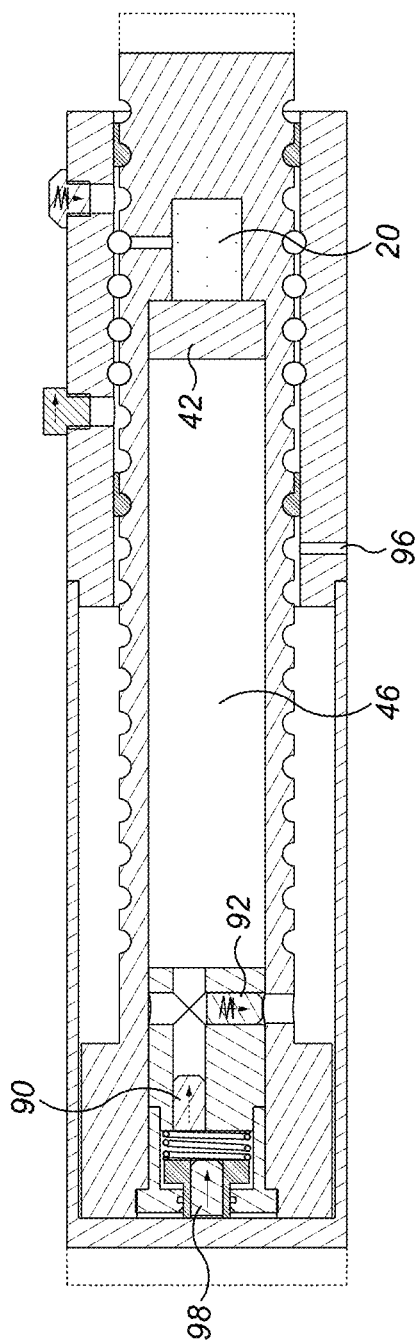

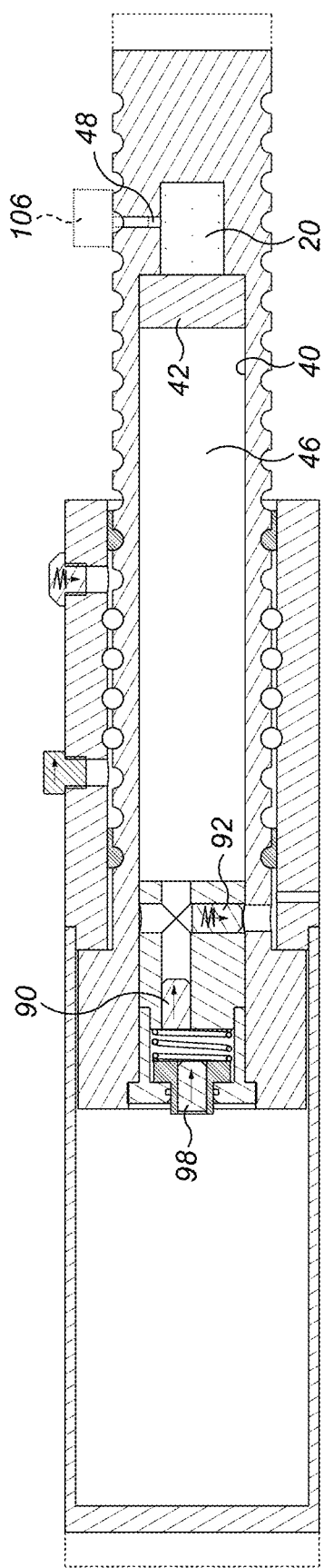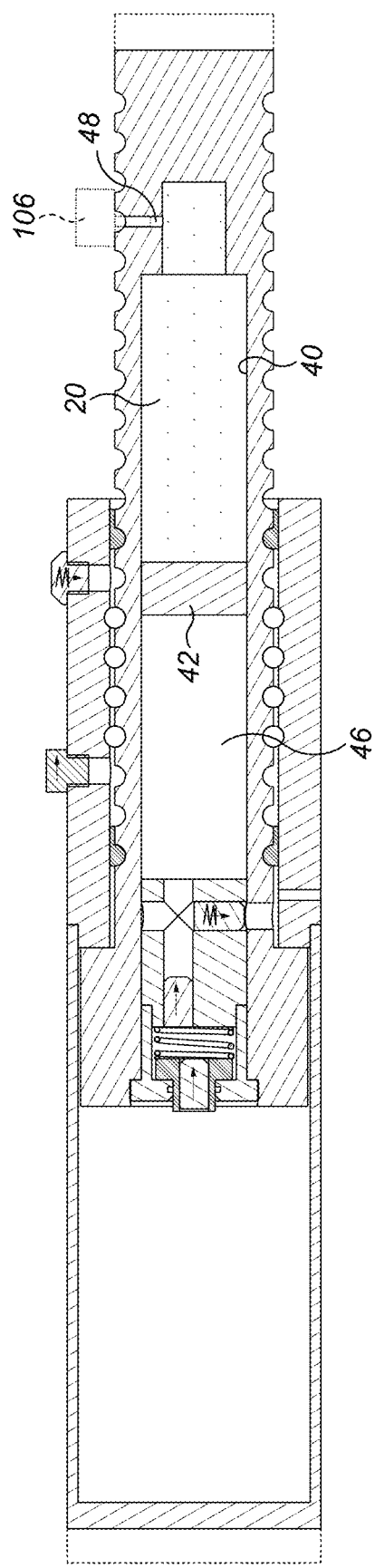

BALLSCREW ACTUATORS

FOREIGN PRIORITY

This application claims priority to European Patent Application No. 19290033.0 filed May 29, 2019, the entire contents of which is incorporated herein by reference.

The present disclosure relates to ballscrew actuators, and in particular to lubrication of ballscrew actuators.

BACKGROUND

Ballscrew actuators are used to translate a rotational input into an axial displacement with minimal friction losses. Ballscrew actuators are used in a variety of applications, including in aircraft where they may be used to move control surfaces such as flaps and slats, and aircraft engine nacelles, for example in a thrust reversing system.

Ballscrew actuators are lubricated in order to facilitate relative motion between a ballscrew, ballnut and balls. To effect lubrication, a lubricant, normally a lubricant grease, is injected into the interface between the ballscrew and the ballnut. Although seals are normally provided at either end of the ballnut, lubricant escapes from the interface which means that the lubricant must be re-injected into the interface by an operator at regular intervals. This is undesirable as it is necessary to perform a manual maintenance activity in order to effect this process, which is costly.

It is therefore desirable to supply lubricant in a way which requires less manual replenishment.

SUMMARY

The present disclosure provides a ballscrew actuator. The ballscrew actuator comprises a ballnut having at least one first helical groove formed on a radially inner surface and defining an axis, a ballscrew disposed along the axis within the ballnut, the ballscrew having at least one second helical groove formed on a radially outer surface and opposed to the first helical groove so as to form at least one helical raceway and a plurality of balls or rolling elements disposed in the at least one helical raceway. The ballscrew is movable relative to the ballnut between a stowed position and a deployed position. The ballscrew comprises a ballscrew bore extending axially therein. A lubrication piston is mounted for sliding movement within the ballscrew bore and divides the ballscrew bore axially into a lubricant receiving portion and a pressurising portion. At least one lubrication passage extends between the lubricant receiving portion of the ballscrew bore and an interface between the ballscrew and the ballnut. The actuator further comprises a pump. The pump comprises a pump chamber having an outlet in fluid communication with the pressurising portion of the ballscrew bore, an air inlet passage (for admitting air into the pump chamber and a pumping piston movable in a pumping direction for pressurising air in the pump chamber. The pumping piston is configured and arranged such that it is moved in the pumping direction as the ballscrew moves axially relative to the ballnut by engagement with an opposing structure of the actuator during movement of the ballscrew between its stowed and deployed positions. The pressurised air moves into the pressurising portion of the ballscrew bore through the outlet so as to move the lubrication piston therein, thereby to move lubricant through the lubrication passage.

The pump may be provided in the ballscrew bore, for example arranged coaxially with the ballscrew bore.

The pumping piston may be movable in an axial direction relative to the actuator axis to effect pumping.

The opposed structure may be an end wall surface of a cylinder enclosing a portion of the ballscrew.

It an alternative arrangement, the pumping piston may be movable in a transverse direction, for example radially, relative to the actuator axis to effect pumping.

In such an arrangement, a head of the pumping piston may be received in a recess, for example a groove, in a surrounding wall in a first axial position, the head of the pumping piston being deflected out of the recess to effect a pumping movement of the pumping piston as the ballscrew moves axially relative to the ballnut.

In certain embodiments, the air inlet passage may be formed through the pumping piston.

In alternative arrangements, the air inlet passage may be formed through a wall of the pump.

In embodiments of the disclosure, the pump may further comprise a first non-return valve associated with the outlet of the pump chamber for preventing pressurised air from travelling from the pressurising portion of the ballscrew bore into the pump chamber.

In embodiments of the disclosure, the pump may further comprise a second non-return valve associated with the air inlet passage of the pump to prevent air from escaping from the pump chamber through the air inlet passage during pumping.

Embodiments of the disclosure, may further comprise a third non-return valve arranged downstream of the first non-return valve for venting air from the pressurising portion of the ballscrew bore when the pressure of air therein exceeds a predetermined pressure.

Embodiments of the disclosure may comprise a plurality of lubrication passages extending from the ballscrew bore at different axial positions.

Embodiments of the disclosure may further comprise a first wiper disposed at a first axial end of the ballnut to seal between the ballscrew and the ballnut and a second wiper disposed at a second axial end of the ballnut to seal between the ballscrew and the ballnut. The first wiper and second wiper may define a cavity therebetween for receiving the lubricant.

Embodiments of the disclosure may further comprise a lubricant refilling passage formed in the ballscrew or the ballnut for refilling the lubricant portion of the ballscrew bore with lubricant. The lubricant refilling passage may optionally be formed in the ballscrew and be formed by the lubrication passage or a passage separate therefrom.

The disclosure also extends to a method of refilling a ballscrew actuator in accordance with the disclosure comprising attaching a source of lubricant to a lubricant refilling passage and supplying lubricant under pressure therethrough so as to replenish the lubricating portion of the ballscrew bore and move the lubricating piston within the ballscrew bore to accommodate the lubricant.

BRIEF DESCRIPTION OF DRAWINGS

FIG. 1 shows, schematically, a first embodiment of ballscrew actuator in accordance with the invention disclosure in an initial stowed configuration;

FIG. 2 shows the actuator of FIG. 1 in a deployed configuration;

FIG. 3 shows the actuator of FIG. 2 in a subsequently stowed configuration;

FIG. 4 shows the actuator of FIG. 1 in a further stowed configuration;

FIG. 5 illustrates the actuator of FIG. 1 at the beginning of lubricant replenishment;

FIG. 6 illustrates the actuator of FIG. 1 during lubricant replenishment;

DETAILED DESCRIPTION

Figure 7:
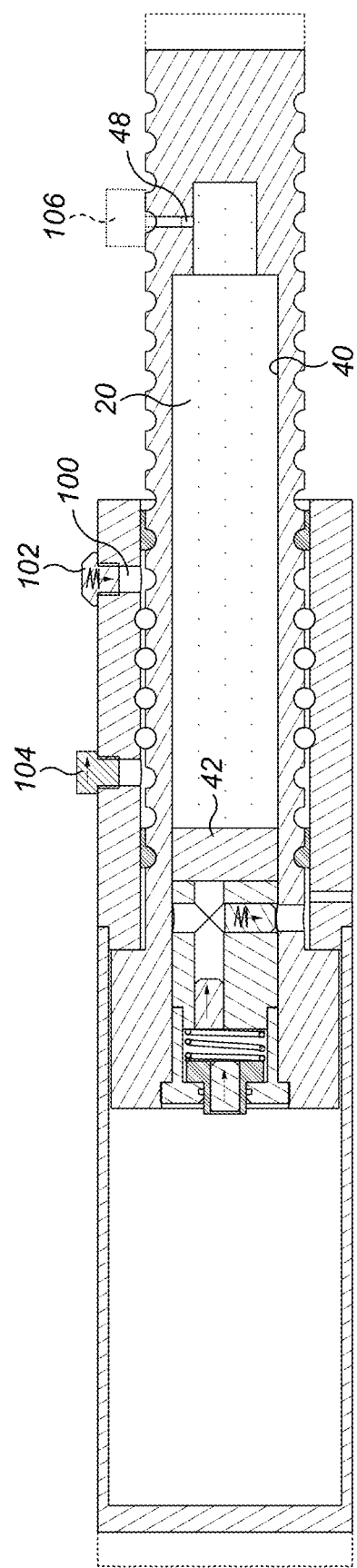
FIG. 7 illustrates the actuator of FIG. 1 fully replenished.

With reference to FIGS. 1 to 7, a first embodiment of ballscrew actuator 2 in accordance with the disclosure comprises a ballscrew 4 and ballnut 6.

The ballnut 6 has a first helical groove 8 formed on a radially inner surface 10 thereof. The ballscrew 4 is disposed along the axis X of the ballnut 6, and has a second helical groove 12 formed on a radially outer surface 14 thereof and opposed to the first helical groove 8 so as to form a helical raceway 16. A plurality of balls or other rolling elements 18 is disposed in the helical raceway 16 for transmitting movement between the ballnut 6 and the ballscrew 4. The balls 18 are recirculated within the raceway 16 in any convenient manner as known in the art. As is known in the art, a plurality of raceways 16 may be provided, with balls 18 being recirculated within each individual raceway 16.

The ballscrew 4 is translatable linearly relative to the ballnut 6 between a stowed position (shown in FIG. 1) and a deployed position (shown in FIG. 2). This translation is effected by relative rotation of the ballscrew 4 relative to the ball nut 6. In this embodiment, the ballscrew 4 is attached at its free end 30 to a translating structure 32 (shown schematically). The ball nut 6 is rotated about its axis X by a rotary drive 34 (also shown schematically).

A lubricant 20, for example a lubricating grease, is received between the ballscrew 4 and the ballnut 6 to facilitate relative movement of the ballnut 6, ballscrew 4 and balls 18 and reduce wear.

A first wiper 22 is disposed at a first axial end 24 of the ballnut 6 and a second wiper 26 is disposed at a second axial end 28 of the ballnut 6. The first and second wipers 22, 26 define the ends of a cavity 36 formed between the ballscrew 4 and the ballnut 6, in which the lubricant 20 is retained. The cavity 36 defines an interface 38 between the ballscrew 4 and the ballnut 6.

The first and second wipers 22, 26 will not, however, be completely effective in retaining the lubricant 20 within the cavity 36 and after some time the lubricant 20 will have to be replenished. To date, this has been done manually at regular intervals, but this is costly.

The illustrated actuator 2 of the disclosure incorporates a system which allows for replenishment of the lubricant 20 during operation of the actuator 2, thereby reducing the number of times manual replenishment is required, or in some instances obviating the need to replenish lubricant at all.

In the actuator 2 in accordance with the disclosure, the ballscrew 4 includes a ballscrew bore 40 extending axially therein. A lubricant supply piston 42 is slidably mounted within the ballscrew bore 40. The lubricant supply piston 42 divides the ballscrew bore 40 axially into a lubricant receiving portion 44 formed on one side of the lubricant supply piston 42 and a pressurising portion 46 and formed on the opposite side of the lubricant supply piston 42. As the lubricant supply piston 42 moves along the ballscrew bore 40, the relative sizes of the lubricant receiving portion 44 and the pressurising portion 46 will change, as can be seen for example in FIGS. 1, 2 and 3. The ballscrew bore 40 acts as a reservoir for the lubricant 20 for the actuator 2.

A lubrication passage 48 extends between the lubricant receiving portion 44 of the ballscrew bore 40 and the cavity 36/interface 38 between the ballscrew 4 and the ballnut 6 for conducting lubricant 20 from the lubricant receiving portion 44 of the ballscrew bore 40 into the cavity 36 and to the interface 38. As can be seen from FIG. 4, the lubrication passage 48 is arranged in a portion of the ballscrew bore 40 which is not obstructed by the lubricant supply piston 42 in the end position of the lubricant supply piston 42 in the ballscrew bore 40. The lubrication passage 48 may open into the helical groove 12 of the ballscrew 4, or into the ridge 50 between adjacent turns of the helical groove 12. A plurality of circumferentially spaced lubrication passages 48 may be provided.

In order to supply lubricant 20 from the lubricant receiving portion 44 of the ballscrew bore 40 to the cavity 36/interface 38 through the lubrication passage 48, the actuator 2 further comprises a pump 60 which is in fluid communication with the pressurising portion 46 of the ballscrew bore 40. In this embodiment, the pump 60 is arranged within the ballscrew bore 40, but in other embodiments, the pump 60 may be arranged elsewhere. The pump 60 may be preassembled as a unit and suitably mounted in the open end of the ballscrew bore 40.

The pump 60 comprises a pump chamber 62 having an outlet 64 for conducting pressurised air to the pressurising portion of 44 of the ballscrew bore 40. A pumping piston 66 is arranged for reciprocating movement within the pump chamber 62. The pumping piston 66 has an air inlet passage 68 formed therethrough for admitting air into the pump chamber 62.

It will be seen from FIGS. 1 and 2 for example, that in this embodiment the pump piston 66 has a portion 70 which projects from the pump 60. The air inlet passage 68 extends through the projecting portion 70. As can further be seen from FIGS. 1 and 2, the pump piston 66 is resiliently biased to a position in which the portion 70 projects from the pump 60 by a spring 72, for example a coil spring, which is located between a face 74 of the pump piston 66 and a location 76 on the pump body.

As can best be seen in FIG. 2, the edge 78 of the projecting portion 70 is arranged opposite a structure 80. In this embodiment, the structure 80 is the inner surface 80 of an end wall 82 of a cylinder 84 which is mounted for rotation with the ballnut 6. A second end 86 of the ballscrew 4 may be slidably mounted within the cylinder 84 to support that end of the ballscrew 4. This may be useful in actuators 2 with long strokes. When the edge 78 contacts the surface 80, it may make a sealing contact therewith. Suitable seals may be provided on the edge 78 and/or the surface 80.

A first non-return valve 90 (shown schematically) is mounted in the outlet 64 of the pump 60. The first non-return valve 90 will permit air to pass from the pump chamber 62 to the pressurising portion 46 of the ballscrew bore 40, but not from the pressurising portion 46 of the ballscrew bore 40 into the pump chamber 62.

The pump 60 further comprises a second non-return valve 98 (shown schematically) arranged in the inlet passage 68 of the pump piston 66. This second non-return valve 98 allows air to pass into the pump chamber 62 from outside the pump 60 but prevents air within the pump chamber 62 from escaping through the inlet passage 68 during the pumping movement of the pump piston 66. This means that a seal does not have to be provided between the edge 78 and the surface 80.

A third non-return valve 92 (shown schematically) is mounted downstream of the first non-return valve 90 either in the pump 60 or in the bore 40. The third non-return valve 92 is connected with a vent space 94 formed between the ballscrew 4 and the cylinder 84. The vent space 94 is vented to ambient through vents 96 in the cylinder 84 or ballnut 6. The opening pressure of the second non-return valve 92 is set such that it does not open during normal pumping operation of the pump 60 while there is lubricant 20 in the bore 40 but will open when the pressure of air within the pressurising portion 46 of the ballscrew bore 40 exceeds a predetermined value.

Finally, the ballnut 6 in this embodiment is provided with a lubricant refilling passage 100. A grease nipple 102 or other fluid coupling may be permanently or removably fitted to the lubricant refilling passage 100. A lubricant vent 104 may also be provided in the ballnut 6. The lubricant refilling passage 100 extends between an external surface of the ballnut 6 and the cavity 36. In certain embodiments, the lubricant refilling passage 98 may align axially with the lubrication passage 48 when the ballscrew 4 is in a fully stowed position.

Having described the structure of the actuator 2, its mode of operation will now be described.

FIG. 1 shows the actuator 2 in an initial stowed configuration in which the substantially the entire ballscrew bore 40 is filled with lubricant 20. Rotation of the ballnut 6 will, via the balls 18 cause the ballscrew 4 to translate axially relative to the ballnut 6 to a deployed position, shown in FIG. 2. It will be seen that in this position, the projecting portion 70 of the pump piston 66 projects from the pump 60 under the biasing force of the spring 72.

Rotation of the ballnut 6 in the opposite direction will cause the ballscrew 4 to retract into the ballnut 6 and cylinder 84. The ballscrew 4 retracts to the stowed position shown in FIG. 3. It will be understood from FIG. 3 that as the ballscrew 4 moves towards the stowed position, the edge 78 of the projecting portion will come into contact with the inner surface 80 of the cylinder end wall 82. As the ballscrew 4 moves further towards the stowed position, the pump piston 66 will be moved into the pump chamber 62 against the force of the spring 72. As it moves into the pump chamber 62, the pump piston 66 pressurises the air in the pump chamber 62, that air flowing out through the first non-return valve 90 and outlet 64 into the pressurising portion 46 of the ballscrew bore 40. Pressurised air cannot escape back through the inlet passage 68 by virtue of the second non-return valve 98. If a good seal were formed between the lip 78 of the projecting portion 70 of the pump piston 66, then the second non-return valve 98 could be omitted. The pressurised air entering the pressurising portion of the ballscrew bore 40 forces the lubricant supply piston 42 along the bore 40 by a predetermined amount x, as shown in FIG. 3. The amount of movement x will depend upon the volume of air pumped into the bore 40. This in turn will depend on the dimensions of the pump piston 66 and its stroke. A constant volume of air will be supplied to the ballscrew bore 40 each time the pump 60 operates. Pressurised air is retained at pressure within the pressurising portion 46 of the ballscrew bore 40 by means of the first and third non-return valves 90, 92 and the lubricating piston 42.

The ballscrew 4 will then be deployed once more. During deployment, air can enter the pump chamber 62 through the air inlet passage 68 once the pump piston 72 moves out of engagement with the surface 80. The second non-return valve 98 will allow air to flow into the pump chamber 62 through the air inlet passage 68.

Each time the ballscrew 4 returns to its stowed position, the air in the pump chamber 62 will once more be pressurised by the pump piston 72 and enter the ballscrew bore 40, moving the lubricant supply piston 42 further along the bore 40. Air in the ballscrew bore 40 cannot re-enter the pump chamber 62 because of the first non-return valve 90 nor escape through the third non-return valve 92.

Eventually, the lubricant supply piston 42 will reach its limit position, shown in FIG. 4, dispensing a last dose of lubricant 20 into the ballscrew/ballnut interface 38.

In a subsequent stowing operation, (also corresponding to FIG. 4) the projecting portion 70 of the pump piston 66 will still engage the surface 80 of the cylinder end wall 82 and air will be pumped into the outlet passage 64 of the pump 60 and through the first non-return valve 90. As the lubricant supply piston 42 cannot move further in the ballscrew bore 40, the pressure of air within the pressurising portion 46 of the ballscrew bore 40 will increase. However, at a predetermined pressure the third non-return valve 92 will open so as to allow the air to vent to ambient through the vent passage 96. The opening pressure of the third return valve 92 is set to permit this venting. The ballscrew 4 may therefore be deployed and retracted without hindrance after the lubricant supply piston 42 has reached its limit position.

When the reservoir of lubricant 20 in the ballscrew bore 4 has been exhausted as illustrated in FIG. 4, the ballscrew bore 40 can be refilled as will be described further below. However, in some embodiments, it may not be necessary to refill the bore 40. For example, if the number of deploy/stow cycles to emptying the ballscrew bore 40 of lubricant 20 exceeds the normal operating life of the actuator 2, no refilling will be needed.

To refill the ballscrew bore 40 with lubricant 20, the ballscrew can be extended to a fully deployed position (as shown in FIG. 5) or a partially deployed position, provided the lubrication passage 48 is accessible.

In the fully deployed position of the ballscrew 4 shown in FIG. 5, an adapter 106 such as a grease nipple may be mounted to the lubrication passage 48. A lubricant supply, for example a grease gun, may be coupled to the grease nipple 106 and lubricant then pumped through the lubrication passage 48 into the ballscrew bore 40. The pressurised lubricant 20 pushes the lubricant supply piston 42 back along the ballscrew bore 40 as shown in FIG. 6. The air contained in the pressurising portion 46 of the ballscrew bore 4 is pressurised due to the movement of the lubricant supply piston 42, but is vented to ambient through the third non-return valve 92. First non-return valve 90 remains closed during lubricant refilling.

Refilling continues until the lubricant supply piston 42 reaches its limit position illustrated in FIG. 7, after which no further lubricant 20 may be admitted into the ballscrew bore 40 and the lubricant source and grease nipple 106 can be removed from the lubrication passage 48.

If it is desired to refill the cavity 36 with lubricant 20 as well, lubricant 20 may be supplied through the grease nipple 102 or other fluid coupling on the ballnut 6. The lubricant 20 can be supplied until such time as it exudes from the vent 104, indicating that the cavity 36 is full of lubricant 20. Alternatively, the cavity 36 may simply be refilled with lubricant 20 within a small number of deploy/stow cycles by the flow of lubricant 20 into the cavity 36 through the lubrication passage 48.

After refilling with lubricant 20, subsequent stowing operations will dispense lubricant 20 into the ballscrew/ballnut interface 38 as described above.

It will be understood from the above that embodiments of the disclosure are advantageous in that they allow for lubricant 20 to be supplied to the ballscrew/ballnut interface 38 continuously during operation. This means that lubricant lost from the cavity 36 is constantly replenished meaning that the need for an operator to reapply lubricant manually is much reduced. That means that the actuator 2 can remain in service for much longer without maintenance.

It will be appreciated that various modifications may be made to the embodiment above without departing from the scope of the disclosure.

Figure 8:
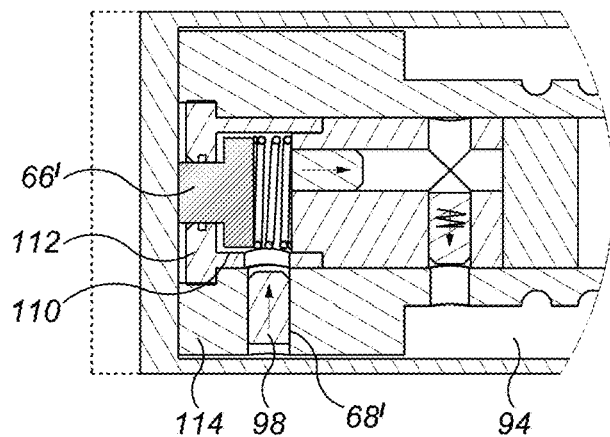
FIG. 8 illustrates a detail of a second embodiment of ballscrew actuator in accordance with the invention.
Figure 9:
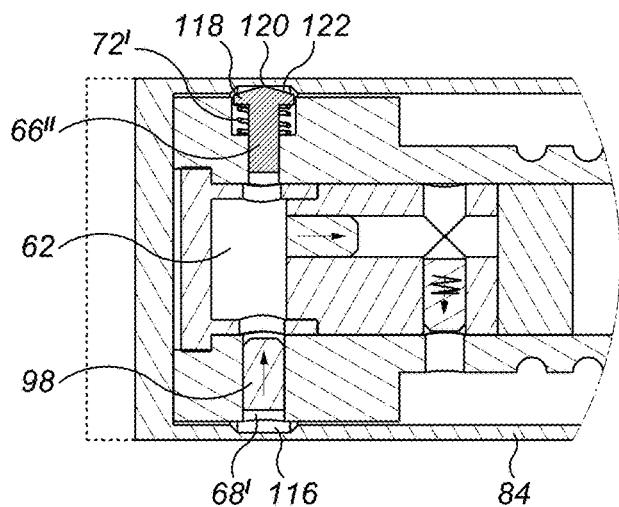
FIG. 9 illustrates a detail of a third embodiment of ballscrew actuator in accordance with the invention.
Figure 10:
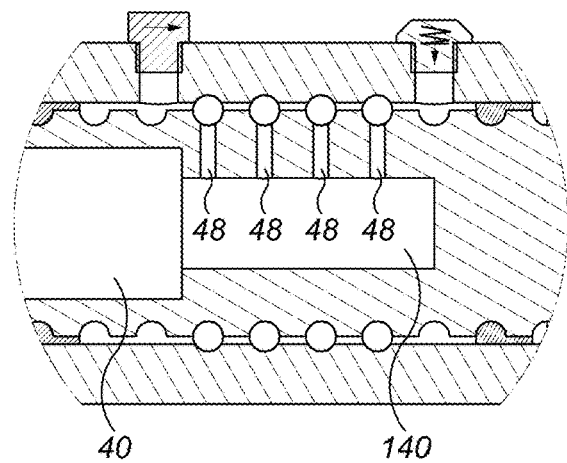
FIG. 10 illustrates a detail of a fourth embodiment of ballscrew actuator in accordance with the invention.

Details of some such modifications are illustrated in FIGS. 8 to 10. The general construction and operation of the actuators illustrated in these Figures is generally similar to that of the embodiment of FIGS. 1 to 7 and only the differences have been illustrated and will be described in detail.

In the embodiment of FIG. 8, an air inlet passage 68' is formed through a wall 110 of the pump body 112 and through the wall 114 of the ballscrew 4 rather than through the pumping piston 66'. The second non-return valve 98 is mounted in the portion of the passage 68' passing through the ballscrew wall 114.

In this embodiment, air is sucked into the pump chamber 62 from the vent space 94 through the second non-return valve 98 as the pumping piston 66' is urged to project from the pump body 112 by the spring 72 as the ballscrew 4 is deployed. Such an embodiment may be advantageous as it may simplify construction of the pump 60.

In the embodiment of FIG. 9, the air inlet passage 68' is formed in a similar manner to that of the embodiment of FIG. 8. However, in this embodiment, the pumping piston 66" is mounted through the ballscrew side wall 114 rather than though an end wall of the pump 60. The cylinder side wall 84 is formed with an internal recess, in this embodiment an annular groove 116. Thus in this embodiment, the pumping piston 66" is arranged transversely to the axis X of the actuator 2, rather than aligned therewith or parallel thereto.

In the fully stowed position of the ballscrew 4, the head 118 of the pumping piston 66" is biased into the groove 116 by a spring 72'. The profiles of the groove 116 and piston head 118 are such that as the ballscrew 4 is deployed, the head 118 of pumping piston 66" is cammed out of the groove 116 thereby moving the pumping piston 66" radially inwardly, so as to compress air in the pump chamber 62.

In this embodiment, the piston head 118 is crowned, having a raised central portion 120 surrounded by an angled surface 122 which engages a chamfered or angled edge 124 of the groove 116. Once the pumping piston 66" has moved radially inwardly, its head 118 will ride along the internal surface 126 of the cylinder side wall 84. When the ballscrew 4 is stowed once more, the piston head 118 will re-enter the groove 116, allowing the pumping piston 66' to move radially outwardly. As it does so, it will draw air into the pump chamber through the inlet passage 68' and the second non-return valve 98.

The embodiment of FIG. 10 is similar to that of FIG. 7, except that instead of having a single lubrication passage 48, more than one (for example four) lubrication passages are provided. In this example, the reduced diameter distal end 140 of the ballscrew bore 40 is elongated compared to that of the earlier embodiment Such an embodiment may be advantageous in constructions where there is more than one ball circulation path, so that lubricant 20 may be supplied individually to those paths through the respective lubrication passages 48. Of course, during refilling of the ballscrew bore 40, the additional lubrication passages 48 will have to be plugged to prevent lubricant 20 from escaping therethrough. It will be appreciated that multiple lubrication passages 48 may also be provided in the other embodiments described above.

In a yet further arrangement (not illustrated), rather than using the lubricant passage 48 as a refilling passage as in the above embodiments, a separate refilling passage may be provided in the ballscrew 4 in fluid communication with the lubricant receiving portion 44 of the ballscrew bore 40. This refilling passage may be positioned such that it is accessible when the ballscrew 4 is in its stowed position, thereby avoiding the need to at least partially deploy the ballscrew 4 to replenish the lubricant 20.

It will be appreciated that in the above embodiments, the ballnut 6 is rotated while the ballscrew 4 translates axially. In other embodiments, however, the ballscrew may rotate and the ballnut translate. The same lubricant supply mechanism can be used in this arrangement.

Also, in some embodiments, the pump 60 may be provided outside the ballscrew bore 40, for example in a separate bore radially offset from the ballscrew bore 40 and fluidly connected thereto.

In further embodiments, the pump piston inlet 68 of the first embodiment need not project from the pump 60, and a suitable projection may instead be provided on the wall surface 80.

In yet further embodiments, the pumping piston may be arranged such that it moves in a tangential direction relative to the axis X to effect a pumping movement. In such embodiments, a radial structure may engage the pumping piston as the ballscrew 4 and ballnut 6 rotate.

The disclosure is applicable to all forms of ballscrew actuators, but may find particular application in aircraft actuation such as thrust reverser actuators, flap and slat actuators and the like.

The invention claimed is:

1. A ballscrew actuator comprising:
    a ballnut having at least one first helical groove formed on a radially inner surface and defining an axis (X);
    a ballscrew disposed along the axis (X) within the ballnut, the ballscrew having at least one second helical groove formed on a radially outer surface and opposed to the first helical groove so as to form at least one helical raceway;
    a plurality of balls or rolling elements disposed in the at least one helical raceway;
    the ballscrew being movable relative to the ballnut between a stowed position and a deployed position;
    wherein the ballscrew comprises:
    a ballscrew bore extending axially therein;
    a lubrication piston mounted for sliding movement within the ballscrew bore and dividing the ballscrew bore axially into a lubricant receiving portion and a pressurising portion; and
    at least one lubrication passage extending between the lubricant receiving portion of the ballscrew bore and an interface between the ballscrew and the ballnut;
    the actuator further comprising:
    a pump;
    wherein the pump comprises:
    a pump chamber having an outlet in fluid communication with the pressurising portion of the ballscrew bore;
    an air inlet passage for admitting air into the pump chamber;

and a pumping piston movable in a pumping direction for pressurising air in the pump chamber, the pumping piston being configured and arranged such that it is moved in the pumping direction as the ballscrew moves axially relative to the ballnut by engagement with an opposing structure of the actuator during movement of the ballscrew between its stowed and deployed positions;

the pressurised air moving into the pressurising portion of the ballscrew bore through the outlet so as to move the lubrication piston therein, thereby to move lubricant (20) through the lubrication passage.

2. A ballscrew actuator as claimed in claim 1, wherein the pump is provided in the ballscrew bore.

3. A ballscrew actuator as claimed in claim 1, wherein the pumping piston is movable in an axial direction relative to the actuator axis (X) to effect pumping.

4. A ballscrew actuator as claimed in claim 3, wherein the opposed structure is an end wall surface of a cylinder enclosing the ballscrew.

5. A ballscrew actuator as claimed in claim 1, wherein the pumping piston is movable in a transverse direction relative to the actuator axis (X) to effect pumping.

6. A ballscrew actuator as claimed in claim 5, wherein a head of the pumping piston is received in a recess in a surrounding wall in a first axial position, the head of the pumping piston being deflected out of the recess to effect a pumping movement of the pumping piston as the ballscrew moves axially relative to the ballnut.

7. A ballscrew actuator as claimed claim 1, wherein the air inlet passage is formed through the pumping piston.

8. A ballscrew actuator as claimed in claim 1, wherein the air inlet passage is formed through a wall of the pump.

9. A ballscrew actuator as claimed in claim 1, further comprising a first non-return valve associated with the outlet of the pump chamber for preventing pressurised air from travelling from the pressurising portion of the ballscrew bore into the pump chamber.

10. A ballscrew actuator as claimed in claim 1, further comprising a second non-return valve associated with the air inlet passage of the pump to prevent air from escaping from the pump chamber through the air inlet passage during pumping.

11. A ballscrew actuator as claimed in 10, further comprising a third non-return valve arranged downstream of the first non-return valve for venting air from the pressurising portion of the ballscrew bore when the pressure of air therein exceeds a predetermined pressure.

12. A ballscrew actuator as claimed in claim 1, comprising a plurality of lubrication passages extending from the ballscrew bore at different axial positions.

13. A ballscrew actuator as claimed in claim 1, further comprising:
    a first wiper disposed at a first axial end of the ballnut to seal between the ballscrew and the ballnut; and
    a second wiper disposed at a second axial end of the ballnut to seal between the ballscrew and the ballnut;
    wherein the first wiper and second wiper define a cavity therebetween for receiving the lubricant.

14. A ballscrew actuator as claimed in claim 1, further comprising a lubricant refilling passage formed in the ballscrew or the ballnut for refilling the lubricant portion of the ballscrew bore with lubricant.

15. A ballscrew actuator as claimed in claim 14, wherein the lubricant refilling passage is formed in the ballscrew by the lubrication passage or a passage separate therefrom.

16. A method of refilling a ballscrew actuator as claimed in claim 1 with lubricant, the method comprising:
    attaching a source of lubricant to a lubricant refilling passage; and
    supplying lubricant under pressure therethrough so as to replenish the lubricating portion of the ballscrew bore and move the lubricating piston within the ballscrew bore to accommodate the lubricant.

17. A ballscrew actuator as claimed in claim 2, wherein the pump is arranged coaxially with the ballscrew bore.

18. A ballscrew actuator as claimed in claim 1, wherein the pumping piston is movable in a radial transverse direction relative to the actuator axis (X) to effect pumping.

* * * * *